United States Patent Office 3,387,209
Patented June 4, 1968

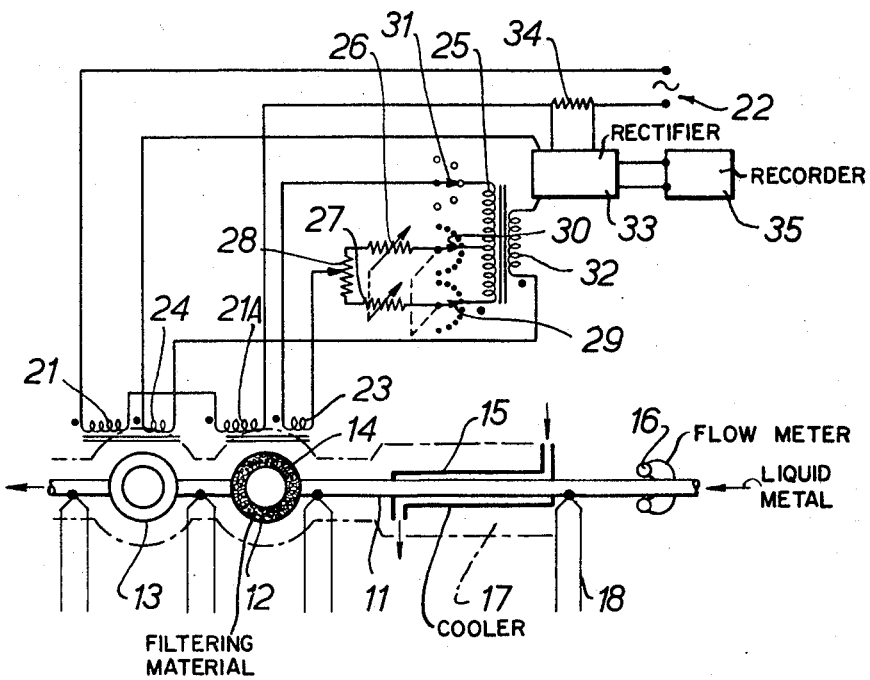

3,387,209
METHOD AND APPARATUS FOR MEASURING THE METAL OXIDE CONTENT OF LIQUID METAL
Anthony Rainsford Eames, Stockton Heath, Warrington, and Richard Alexander Hamilton Pool, Farnham, Surrey, England, assignors to United Kingdom Atomic Energy Authority, London, England
Continuation of application Ser. No. 240,699, Nov. 28, 1962. This application Oct. 27, 1967, Ser. No. 678,761
Claims priority, application Great Britain, Dec. 19, 1961, 45,556/61
6 Claims. (Cl. 324—65)

This is a continuation of our previous copending application Ser. No. 240,699, filed Nov. 28, 1962.

This invention relates to liquid metal monitoring apparatus.

Liquid metals, such as sodium or alloys thereof with potassium, are used as the liquid coolant in the cores of certain nuclear reactors. An indication of the metal oxide content of a liquid metal coolant is important since any metal oxide in the coolant can cause corrosion of materials which are not corroded by the liquid metal itself. It is known that the electrical resistivity of a liquid metal varies with the metal oxide content of the liquid metal. Accordingly there has been proposed apparatus for measuring changes in the resistivity of the liquid metal in order to determine changes in the metal oxide content of the liquid metal. Temperature compensating means have been incorporated in this earlier apparatus in order to compensate for variation of the electrical resistivity of the liquid metal with its temperature.

It has also been previously proposed to estimate the saturation temperature of a solution of metal oxide in liquid metal by progressively cooling the liquid metal while simultaneously measuring its electrical resistivity and its temperature. Metal oxide particles are precipitated from the solution at a precipitation temperature which is near and related to the saturation temperature of the solution. The onset of metal oxide precipitation is ascertained by detecting metal oxide particles in the liquid metal, these particles giving rise to sharp peaks in the resistivity of the liquid metal. From the precipitation temperature as measured the saturation temperature of the solution can be estimated and consequently the metal oxide concentration of the solution, by reference to tables of solubility data. In a measurement of the precipitation temperature in this way, no quantitative reading of the electrical resistivity is necessary; it is merely necessary to note the onset of sharp peaks in the indicated resistivity of the liquid metal.

For the purpose of measuring the metal oxide content of a liquid metal the present invention seeks to apply a relationship between this content and the rate and temperature of precipitation of metal oxide particles. Accordingly, the present invention provides apparatus comprising a pipe through which the liquid metal is to flow, a particle collection chamber in the pipe, a filter to retain in the chamber particulate matter borne by the liquid metal, a cooler to lower the temperature of the liquid metal in the chamber, a thermometer to measure the temperature of the liquid metal flowing through the chamber, and means to indicate by electrical resistivity the rate of increase of particulate matter in the chamber. In operation, the apparatus yields precipitation information which enables the metal oxide content to be ascertained, in conjunction, if necessary, with constants previously determined for the particular apparatus employed.

In order to avoid errors due to the effects of temperature variation on the electrical resistivity of the liquid metal, a preferred form of the apparatus comprises two chambers in series along the pipe through which the liquid metal is to flow, a filter in the upstream chamber to retain in that chamber particulate matter borne by the liquid metal, a cooler to lower the temperature of the liquid metal flowing through the chambers, a thermometer to measure said temperature, means for measuring the electrical resistivity of the contents of the two chambers respectively, and means to indicate the difference between the resistivity measurements.

More particularly, the invention provides liquid metal monitoring apparatus comprising a pipe through which the liquid metal is to flow, two toroids formed in the pipe, filtering material in the upstream toroid to trap particulate matter in the liquid metal, induction coils linked electromagnetically with the toroids, and electrical means to compare the induced currents in the toroids. The induced currents in the toroids, being dependent upon the electrical resistivity of the toroids, are related to the relative proportions of particulate matter in each toroid so that a comparison of the induced currents enables the rate of deposition of particulate matter in the upstream toroid to be measured.

The present invention also provides a method of testing the metal oxide content of a flowing liquid metal for the operation of a nuclear reactor employing the liquid metal as coolant wherein the liquid metal is progressively cooled whilst being passed through a filter, and measurements are made of the liquid metal temperature at which metal oxide particles are deposited onto the filter and of the rate of deposition of the particles onto the filter.

In one preferred method according to the invention the temperature of the liquid metal is raised gradually, after metal oxide particles have been deposited on the filter, and a measurement is made of the temperature of the liquid metal at which the rate of deposition of particles onto the filter is zero. A zero rate of deposition is to be understood to mean neither gain nor loss of metal oxide particles on the filter.

One embodiment of the invention will now be described by way of example with reference to the accompanying drawing which is a diagram of the apparatus and its associated electrical circuit.

The apparatus is based upon a pipe 11 through which liquid sodium, drawn from the coolant circuit of a nuclear reactor, flows. The pipe is formed with two circular toroids 12 and 13, the upstream toroid 12 being filled with a filtering material in the shape of a stocking 14 of stainless steel mesh. Upstream of the toroid 12 are provided a cooling jacket 15 and a flowmeter 16. The pipe, the toroids and the cooling jacket are all lagged by thermal insulation 17. Thermocouples 18 have one junction in thermal contact with the pipe on each side of both toroids and between the cooling jacket and the flowmeter.

Two induction coils 21 and 21A are linked electromagnetically with the two toroids respectively. The two induction coils are connected in series and are energized by a source 22 of alternating current. Two probe coils 23, 24 are also linked electromagnetically with the upstream and downstream toroids 12, 13 respectively. The probe coil 23 is connected across one winding 25 of a transformer through variable resistors 26, 27, 28 and selector switches 29, 30, 31 in the following manner. One end of the probe coil 23 is connected through the selector switch 31 to one of five tappings at one end of the winding 25. It will be understood that in the drawing the several connections from various tapping points to the selector switches have been omitted for the sake of simplicity. The other end of the probe coil 23 is connected to the tapping on variable resistor 28 which acts as a potential divider between variable resistors 26 and 27. The variable resistors 26 and 27 are each switched resistors having ten settings and are ganged together. The resistor 26 is connected through selector switch 30 to one of ten tappings at the mid-point of the winding 25. The resistor 27 is connected through selector switch 29 to one of ten tappings at the end of the winding 25 remote from the selector switch 31, selector switches 29 and 30 being ganged together. The probe coil 24 is connected across a second winding 32 of the transformer. In circuit with the probe coil 24 a phase sensitive rectifier 33, energised through leads connected across a resistor 34 in series with the induction coils 21 and 21A, derives a rectified output signal of amplitude representative of the difference between the current induced in the two toroids. This output signal is fed to a recorder 35 where it is plotted against time on a graph.

When the induction coils 21 and 21A are energised by the alternating source 22, alternating currents are induced in the toroids 12 and 13 related to the resistivity of the liquid metal in the downstream toroid 13, on the one hand, and the combined resistivity of the liquid metal, the mesh and any particles trapped in the mesh in the upstream toroid 12, on the other hand. Now if it is desired to monitor the metal oxide content of the liquid sodium, the apparatus is first run with the liquid metal hot so that the metal oxide is held in solution. Under these conditions the variable resistors 26, 27, 28 and the selector switches 29, 30, 31 are adjusted until the alternating voltage induced in the transformer winding 32 by the winding 25 balances the alternating voltage derived from the toroid 13 by the probe coil 24 and the output signal recorded by the recorder 35 is zero. The stream of liquid sodium is then progressively cooled by the cooling jacket 15 while its temperature is monitored by the thermocouples 18. At the precipitation temperature of the metal oxide in liquid metal solution, the metal oxide particles are precipitated and collected by the mesh in the toroid 12 The resistance to the current induced in the toroid 12 is thereby increased and the output signal received by the recorder 35 increases correspondingly. Readings are taken of the precipitation temperature, as measured by the thermocouples, and the rate of increase of electrical resistivity as indicated by the slope of the graph produced by the recorder.

The metal oxide content (P) of the solution can be related to a function of the precipitation temperature ($T_p$) and a correction factor based on the rate of precipitation ($dw/dt$) at the precipitation temperature. The rate of precipitation can, in its turn, be related to the rate of increase of electrical resistivity ($dr/dt$) of the toroid 12, the rate of flow of liquid metal ($f$) as indicated by the flowmeter 16, and a precipitation constant ($\eta$) which is characteristic of the apparatus. This relationship can be written:

$$P = 1.45 \times 10^5 \cdot e^{-4150/T}p + \frac{79.3 \times 10^5}{f \cdot \eta} \cdot \frac{dr}{dt}$$

If the precipitation constant $\eta$ is expressed as a percentage, the flow rate $f$ is in gallons per minutes, the rate of increase of resistivity $dr/dt$ is expressed as a percentage increase per second and the precipitation temperature $T_p$ is in °K. then the metal oxide content P appears as parts per million. Once the precipitation constant has been established for the apparatus, the metal oxide content P can be determined by a measurement of the flow rate of the liquid metal, the precipitation temperature, and the rate of increase of electrical resistivity in the upstream toroid 12.

In an alternative method of monitoring the metal oxide content of the liquid sodium, the apparatus is balanced while hot liquid metal is run through the toroids as described above. The liquid metal is then cooled until metal oxide precipitate is collected in the upstream toroid 12, sufficient for example to raise the resistivity of the toroid 12 by 0.5%. The temperature of the liquid metal is then adjusted until there is no precipitate collected in or dissolved out of the toroid 12, as indicated by a zero rate of change of electrical resistivity in the toroid.

At this temperature (T), which is measured, the term $dr/dt$ in the relationship between the metal oxide content (P) and the temperature given above becomes zero, so that the relationship may be written:

$$P = 1.45 \times 10^5 \cdot e^{-4150/T}$$

Thus it is possible to derive the metal oxide content (P) of the liquid metal directly from a measurement of the liquid metal temperature at which no metal oxide particles are precipitated or dissolved out of the toroid 12.

It is envisaged that in a modified form of apparatus according to the invention a signal representative of the rate of change of electrical resistivity ($dr/dt$) in the toroid 12 could be employed to control the temperature of the cooling medium flowing through the cooling jacket 15 in such a manner that the temperature of the liquid metal is brought automatically to the temperature at which the rate of change of electrical resistivity is zero. In such modified apparatus the thermocouple readings of the liquid metal temperature would be recorded on an instrument calibrated to read the metal oxide content (P) of the solution directly.

We claim:

1. In a method of determining the metal oxide content of a hot flowing liquid metal in which the oxide content is precipitable as particulate matter by cooling the liquid metal, the steps of passing the liquid metal through a filter, progressively cooling the liquid metal to cause deposition of metal oxide particles on the filter as the liquid metal is passed therethrough, adjusting the temperature of the liquid metal to maintain a constant deposit of metal oxide particles on the filter while still permitting flow of said liquid metal through the said filter, and measuring the adjusted temperature.

2. In the method of claim 1, the steps of measuring the resistivity of the liquid metal during cooling to ascertain by increase of the resistivity that deposition of particles has taken place, and subsequently continuing the resistivity measurement to indicate by zero change thereof that the deposit of metal oxide particles on the filter is being maintained constant.

3. A liquid metal monitoring apparatus comprising a pipe through which is to flow a hot liquid metal with a metal oxide content precipitable as particulate matter by cooling of the liquid metal, said pipe having an inlet end for entry of said liquid metal, a particle collection chamber in said pipe, a filter in said chamber to retain particulate matter precipitated from the liquid metal, a cooler operatively connected to said pipe between said inlet and said chamber to lower the temperature of the liquid metal in said chamber, a thermometer means operatively connected to said pipe for measuring the temperature of the liquid metal in said chamber, and means operatively connected to said collection chamber for sensing the electrical resistivity of the contents of the chamber to determine the rate of increase of particulate matter in the chamber.

4. A liquid metal monitoring apparatus as claimed in claim 3 and further comprising a second chamber downstream of said first-mentioned chamber with respect to said inlet end, said first-mentioned chamber only having a filter therein, and said thermometer means being operable to measure the temperature of the liquid metal in both of said chambers, probe means operatively connected to each chamber for sensing the electrical resistivity of the contents thereof, and means connected to said probe means to indicate the difference between the resistivity measurements.

5. A liquid metal monitoring apparatus comprising a pipe through which is to flow a hot liquid metal with a metal oxide content precipitable as particulate matter by cooling of the liquid metal, said pipe having an upstream and a downstream toroid formed therein, filter means in said upstream toroid to trap particulate matter formed by the liquid metal flowing through said pipe, induction coils linked electromagnetically with each of said toroids, and electrical means connected to said coils to compare the electrical currents induced in said toroids.

6. The liquid metal monitoring apparatus as claimed in claim 5 wherein said electrical means comprises probe coils each linked respectively with each toroid with voltages induced therein being responsive to the currents induced in said toroids, and transformer means connected to said probe coils for comparing said voltages.

No references cited.

RUDOLPH V. ROLINEC, *Primary Examiner.*

C. F. ROBERTS, *Assistant Examiner.*